(12) United States Patent
Rosati

(10) Patent No.: US 9,840,307 B2
(45) Date of Patent: Dec. 12, 2017

(54) DEVICE FOR MOUNTING A DERAILLEUR OF A REAR GEARSHIFT ON A BICYCLE FRAME

(71) Applicant: Campagnolo S.r.l., Vicenza (IT)

(72) Inventor: Stefano Rosati, Marano di Mira (IT)

(73) Assignee: Campagnolo S.r.l., Vicenza (IT)

( * ) Notice: Subject to any disclaimer, the term of this patent is extended or adjusted under 35 U.S.C. 154(b) by 139 days.

(21) Appl. No.: 14/549,695

(22) Filed: Nov. 21, 2014

(65) Prior Publication Data

US 2015/0148159 A1  May 28, 2015

(30) Foreign Application Priority Data

Nov. 22, 2013 (IT) .............................. MI2013A1949

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/125 | (2010.01) |
| B62M 9/1248 | (2010.01) |
| F16B 21/18 | (2006.01) |
| F16B 43/00 | (2006.01) |
| F16B 5/02 | (2006.01) |

(52) U.S. Cl.
CPC .......... *B62M 9/125* (2013.01); *B62M 9/1248* (2013.01); *F16B 21/18* (2013.01); *F16B 5/0266* (2013.01); *F16B 43/007* (2013.01)

(58) Field of Classification Search
CPC .... B62M 9/125; B62M 9/126; B62M 9/1248; B62M 9/1244; F16B 43/007

USPC .......................................................... 474/80
See application file for complete search history.

(56) References Cited

U.S. PATENT DOCUMENTS

| | | | | |
|---|---|---|---|---|
| 1,332,626 | A | * | 3/1920 | Henegar ............... F16B 43/007 24/1 |
| 4,494,944 | A | * | 1/1985 | Coue ...................... B62M 9/125 280/238 |
| 4,618,333 | A | * | 10/1986 | Nagano .................. B62M 9/128 474/80 |

(Continued)

FOREIGN PATENT DOCUMENTS

| | | |
|---|---|---|
| EP | 1428746 A2 | 6/2004 |
| FR | 1219725 A | 5/1960 |

OTHER PUBLICATIONS

Italian Search Report and Written Opinion in Italian Application No. IT MI2013A001949, Jun. 17, 2014 with English translation.

*Primary Examiner* — Henry Liu
(74) *Attorney, Agent, or Firm* — Volpe and Koenig, P.C.

(57) ABSTRACT

A device for mounting a derailleur of a rear gearshift on a bicycle frame is provided. The device includes a pin suitable for being fixed in a corresponding seat of said bicycle frame, an annular seat formed on said pin, a support body of said derailleur, a through hole formed in said support body and crossed by said pin, an abutment element associated with said pin in said annular seat, wherein said abutment element provides a support in the axial direction on said pin. Said abutment element comprises a first and a second component, which are shaped like an annular sector and that can be connected together through respective shaped attachment portions.

10 Claims, 11 Drawing Sheets

(56) References Cited

U.S. PATENT DOCUMENTS

| | | | | |
|---|---|---|---|---|
| 4,637,809 A * | 1/1987 | Nagano | B62M 9/126 | 474/80 |
| 4,690,663 A * | 9/1987 | Nagano | B62M 9/125 | 474/80 |
| 5,498,211 A * | 3/1996 | Hsu | B62M 9/1248 | 474/80 |
| 5,836,844 A * | 11/1998 | Yoshida | B62M 9/125 | 411/353 |
| 6,350,212 B1 * | 2/2002 | Campagnolo | B62M 9/126 | 474/80 |
| 6,394,921 B1 * | 5/2002 | Fukuda | B62M 9/126 | 474/80 |
| 6,447,413 B1 * | 9/2002 | Turer | B62J 23/00 | 403/19 |
| 6,902,503 B2 * | 6/2005 | Nanko | B62M 9/137 | 411/302 |
| 6,902,504 B2 * | 6/2005 | Fukuda | B62M 9/1244 | 403/13 |
| 7,396,304 B2 * | 7/2008 | Shahana | B62M 9/127 | 474/80 |
| 7,572,199 B1 * | 8/2009 | Calendrille, Jr. | B62M 9/16 | 474/80 |
| 7,585,237 B2 * | 9/2009 | Fukuda | B62M 9/125 | 403/2 |
| 7,614,972 B2 * | 11/2009 | Oseto | B62M 9/1244 | 474/80 |
| 7,905,804 B2 * | 3/2011 | Yamaguchi | B62M 9/125 | 474/80 |
| 7,963,870 B2 * | 6/2011 | Deguchi | B62M 9/125 | 474/80 |
| 8,142,312 B2 * | 3/2012 | Watarai | B62M 9/125 | 474/80 |
| 8,439,778 B2 * | 5/2013 | Bohm | B62M 9/126 | 474/80 |
| 2004/0171446 A1 * | 9/2004 | Nanko | B62M 9/137 | 474/80 |
| 2006/0182518 A1 * | 8/2006 | Underwood | F16B 43/006 | 411/539 |

* cited by examiner

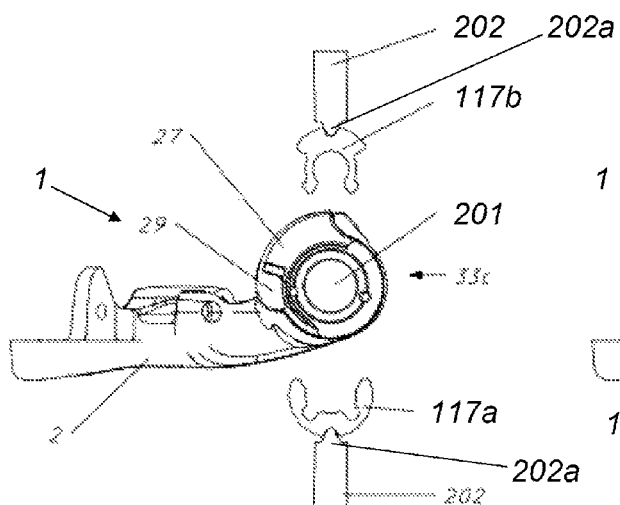
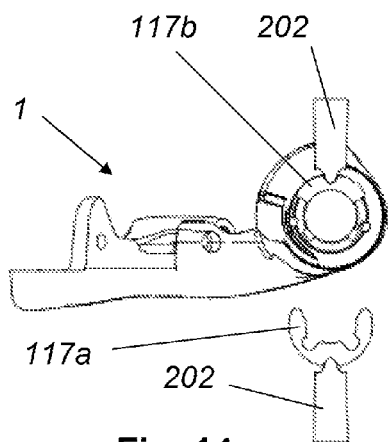
Fig. 13
Fig. 14
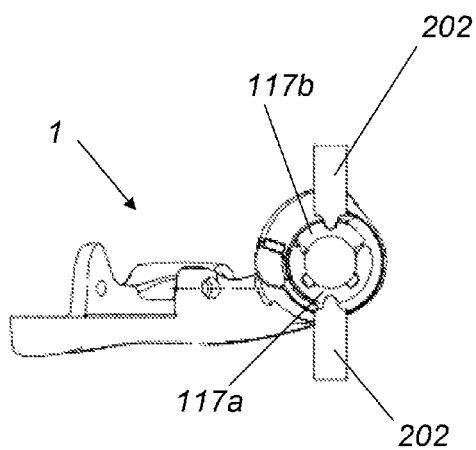
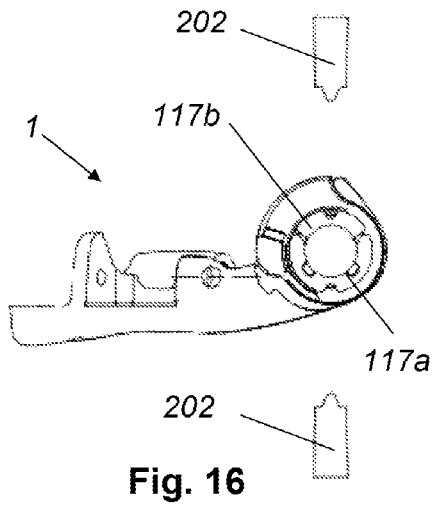
Fig. 15
Fig. 16

DEVICE FOR MOUNTING A DERAILLEUR OF A REAR GEARSHIFT ON A BICYCLE FRAME

CROSS REFERENCE TO RELATED APPLICATION(S)

This application claims the benefit of Italian Application No. MI2013A001949, which was filed on Nov. 22, 2013, and is incorporated herein by reference as if fully set forth.

FIELD OF INVENTION

The present invention concerns a device for mounting a derailleur of a rear gearshift on a bicycle frame, as well as a bicycle rear gearshift comprising said mounting device.

BACKGROUND

As known, the bicycle is a mechanical means moved by muscle force that is transmitted to the rear "driving" wheel through a motion transmission system. It comprises a pair of cranks arms, on which the cyclist exerts a propulsive thrust, one or more driving toothed wheels, set in rotation by direct coupling with the crank arms, and one or more driven toothed wheels or "sprockets", set in rotation by the driving toothed wheels through a chain, said sprockets being coupled with the hub of the rear wheel.

In particular, racing bicycles comprise a plurality of sprockets of various diameters and a plurality of driving toothed wheels, also of various diameters. The chain simultaneously engages a driving toothed wheel and a sprocket and can be selectively moved onto them through a front gearshift and a rear gearshift, so as to obtain the combination of driving toothed wheel and sprocket that offers the gear ratio most suitable for the travel conditions.

The front gearshift is mounted on the bicycle frame close to the plurality of driving toothed wheels and comprises a derailleur that moves the chain from one driving toothed wheel to another. The rear gearshift is mounted on the bicycle frame close to the plurality of sprockets and comprises a derailleur that moves the chain from one sprocket to another.

In the context of the present description, the bicycle gearshift to which reference is made is the rear one.

The derailleur of the rear gearshift is made according to an articulated parallelogram linkage, in which the sides of the parallelogram are articulated in pairs to one another, along respective substantially parallel rotation axes, through pins. In particular, such an articulated parallelogram is formed from a support body, intended to be mounted on the frame, a so-called chain guide suitable for moving the chain between different engaged positions on respective toothed wheels (the sprockets of the sprocket set), and a pair of articulation arms or connecting rods (generally identified as outer connecting rod and inner connecting rod), which connect the chain guide to the support body in a mobile manner. In the derailleur of the rear gearshift the chain guide comprises a rocker arm group.

Each connecting rod is rotatably connected to the support body and to the chain guide through respective articulation pins inserted in respective holes.

The derailleurs can be manually actuated (such derailleurs are also known as mechanical derailleurs) or motor actuated (such derailleurs are also known as electrically commanded derailleurs).

In the articulated parallelogram linkage of the rear gearshift two chain tensioning springs (generally of the helical type) are typically inserted, which work antagonistically to determine the arrangement of the chain guide when engaged with the chain.

Generally, the chain tensioning springs are provided in the support body and in the rocker arm group of the chain guide.

The chain tensioning spring of the support body also has the function of absorbing the bumps that the rear gearshift is inevitably subjected to during use, thus avoiding damage or imprecisions in gearshifting of the rear gearshift.

To mount the derailleur of the rear gearshift on the bicycle frame, a mounting device is used comprising:

- a pin provided with a threaded end portion, which is screwed into a corresponding hole of the bicycle frame;
- the support body of the derailleur;
- a through hole, formed on the support body and that is crossed by the pin; and
- an abutment element associated with the pin in an annular seat thereof, in which the abutment element closes the support body on the pin, i.e. provides a support in the axial direction to the support body on the pin.

An abutment element used in the prior art is an elastic stop ring, typically made from spring steel, the circumferential extension of which is not complete and that is provided, at the two opposite ends, with holes for the engagement of a suitable assembling/disassembling caliper of the elastic stop ring in/from the annular seat.

The Applicant has found that a mounting device of the type described above can undergo improvement in terms of structural strength, ease of assembling and practicality of maintenance.

The technical problem at the basis of the present invention is that of providing a device for mounting a derailleur of a rear gearshift on a bicycle frame in which the abutment element—which provides a support in the axial direction to the support body on the pin—has a greater structural strength than that of the elastic stop ring of the prior art described above, and can be easily mounted also by acting manually, as well as can be rapidly dismounted for maintenance of the bicycle gearshift.

SUMMARY OF THE INVENTION

The solution of the present invention replaces the elastic stop ring used in the prior art with an innovative abutment element comprising two components that can be connected together through fastening.

The present invention therefore concerns, in a first aspect thereof, a device for mounting a rear gearshift on a bicycle frame.

In particular, the present invention concerns a device for mounting a derailleur of a rear gearshift on a bicycle frame, comprising:

- a pin suitable for being fixed in a corresponding seat of said bicycle frame;
- an annular seat formed on said pin;
- a support body of said derailleur;
- a through hole, formed in said support body and crossed by said pin;
- an abutment element associated with said pin in said annular seat, in which said abutment element provides a support in the axial direction on said pin;

wherein said abutment element comprises a first and a second component, which are shaped as annular sectors and which can be connected together through respective shaped attachment portions.

BRIEF DESCRIPTION OF THE DRAWING(S)

Further characteristics and advantages of the present invention will become clearer from the following detailed description of some preferred embodiments thereof, made with reference to the attached drawings and given for indicating but not limiting purposes. In such drawings:

FIG. 3 is an enlarged longitudinal section view of the mounting device of the bicycle rear gearshift of FIG. 1a;

FIGS. 13-16 are views of successive assembling steps of the abutment element of FIG. 10 on the respective mounting device, carried out with a pair of assembling tools of components of the abutment element of FIG. 10;

DETAILED DESCRIPTION OF THE PREFERRED EMBODIMENT(S)

Figure 1:
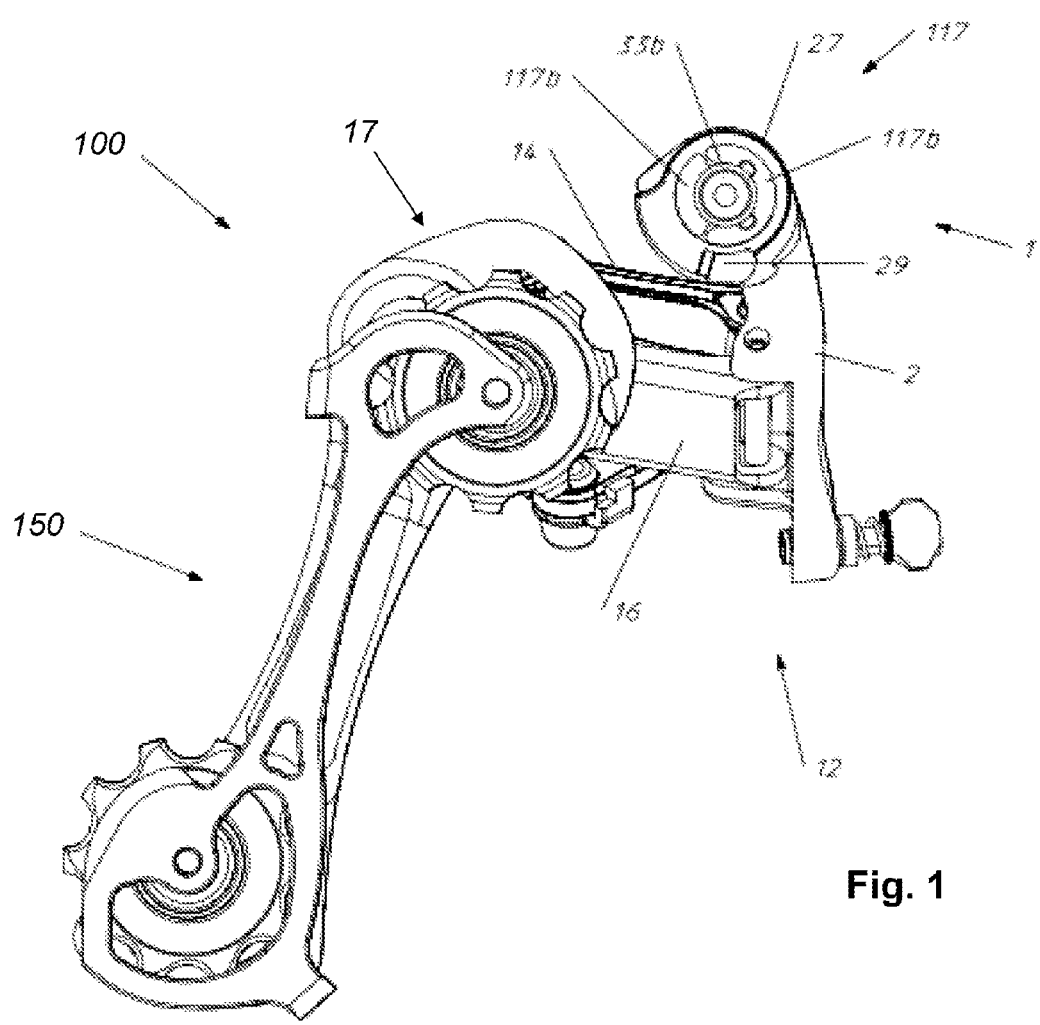
FIG. 1 is a perspective view of a bicycle rear gearshift according to the present invention, comprising a respective mounting device on a bicycle frame according to the present invention.
Figure 1A:
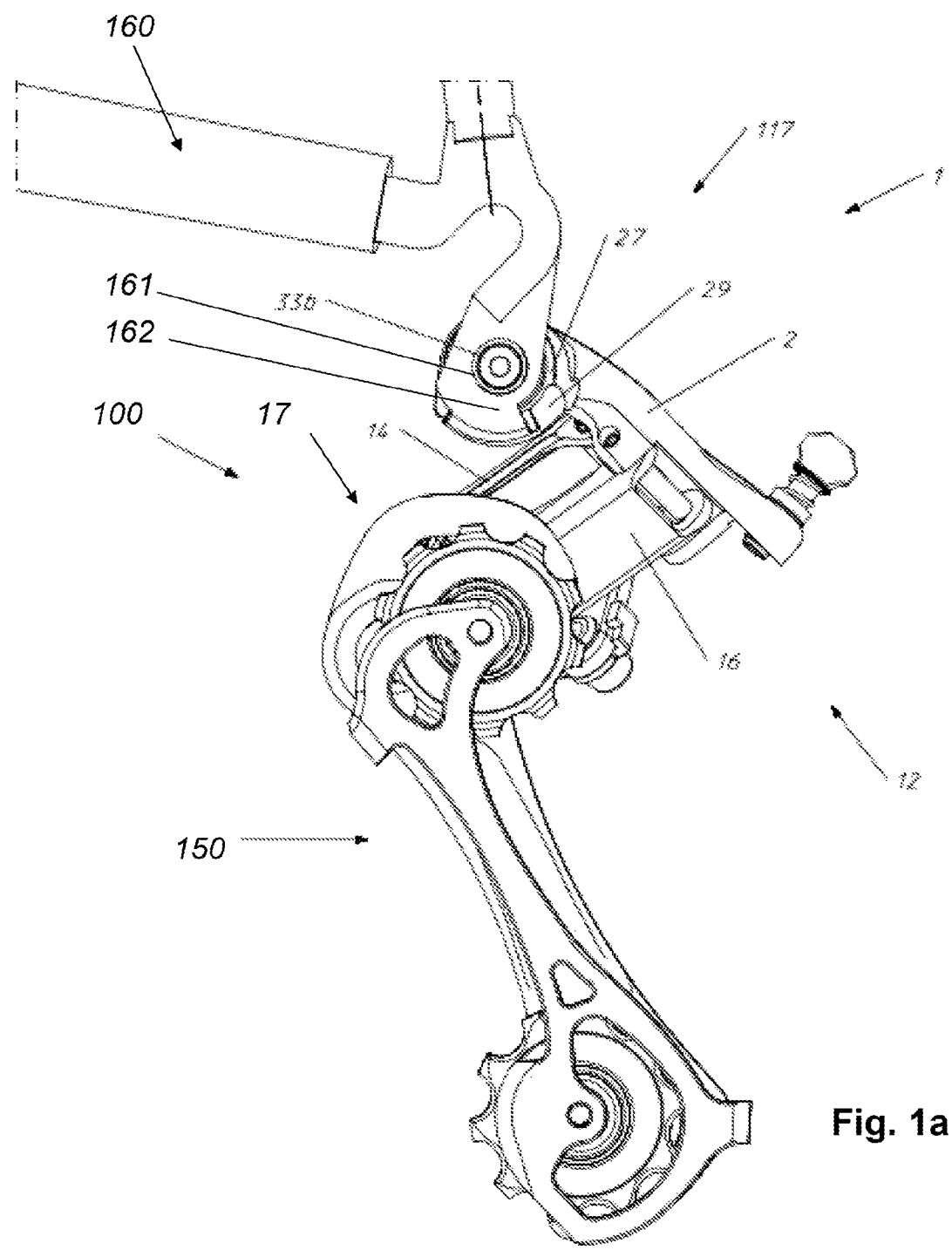
FIG. 1a is a perspective view of the bicycle rear gearshift of FIG. 1 mounted on the bicycle frame, taken from a different point of view from that of FIG. 1.
Figure 2:
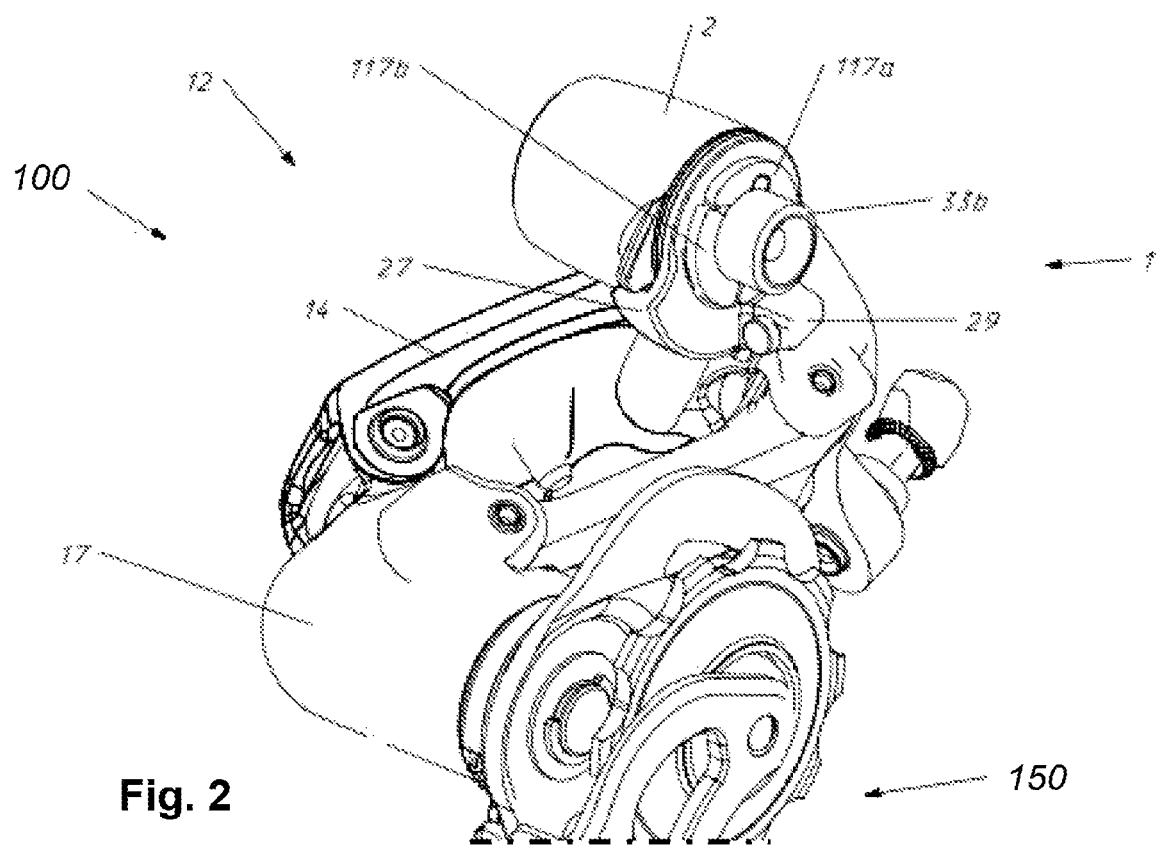
FIG. 2 is a perspective view of a part of the rear gearshift of FIG. 1, taken from a different point of view from that of FIG. 1.
Figure 3:
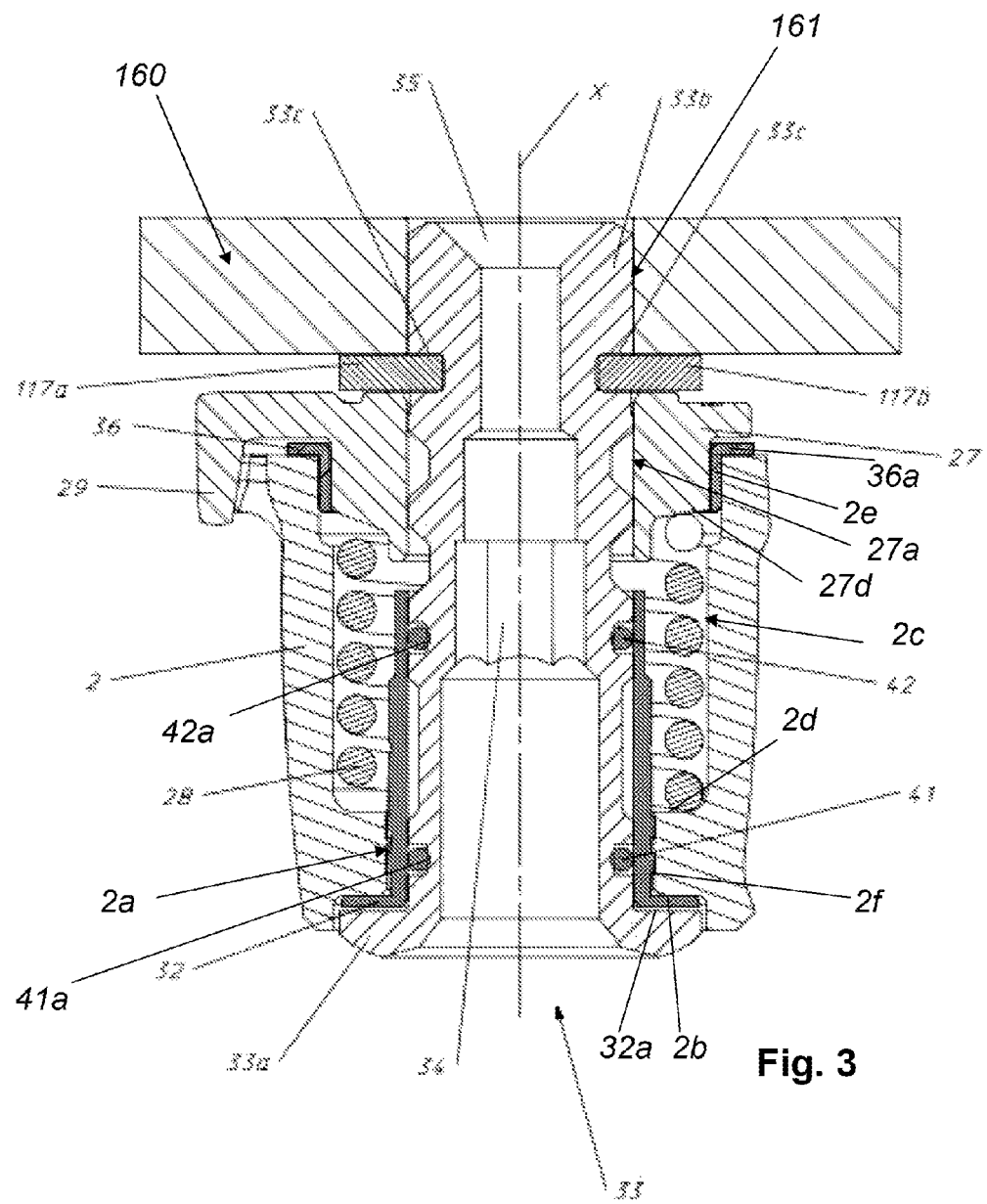

The present invention concerns a device for mounting a derailleur of a rear gearshift on a bicycle frame, comprising: a pin suitable for being fixed in a corresponding seat of said bicycle frame; an annular seat formed on said pin; a support body of said derailleur; a through hole, formed in said support body and crossed by said pin; an abutment element associated with said pin in said annular seat, in which said abutment element provides a support in the axial direction on said pin; wherein said abutment element comprises a first and a second component, which are shaped as annular sectors and which can be connected together through respective shaped attachment portions.

Advantageously, the abutment element of the mounting device according to the invention has a high resistant cross section (which extends for the entire circumferential extension of the annular seat) that can be subjected to substantial loads, greater than those tolerated by the elastic stop ring used in the prior art (the circumferential extension of which is not complete).

Moreover, the aforementioned abutment element used in the invention ensures more balanced support for the element on which it acts with respect to the elastic stop ring of the prior art right because it has substantially complete circumferential extension, avoiding misalignments between abutment element and pin during use.

Furthermore, the abutment element of the mounting device according to the invention allows extremely convenient manual assembling, as well as easy disassembling.

In accordance with a preferred embodiment of the mounting device of the invention, said pin is a screw that has a predetermined axis and is provided with an enlarged head and with a threaded end portion, said enlarged head abutting in a corresponding seat of the support body, and said corresponding seat of said bicycle frame is a threaded hole.

Preferably, the device according to the invention comprises:

a locking bush having a further through hole formed in it and crossed by said pin so that the locking bush is rotatable with respect to the pin, the locking bush comprising a tooth suitable for going into abutment against a fork of said bicycle frame;

a chain tensioning spring, housed in an annular cavity formed in said through hole of said support body and that acts on said locking bush i) around said predetermined axis, so that said support body is thrusted into rotation circumferentially with respect to said locking bush when said tooth is in abutment against said fork of said bicycle frame, and ii) along said predetermined axis of said pin, so that said locking bush is thrusted axially towards said threaded end portion of said pin;

in which said abutment element provides a support in the axial direction to said locking bush on said pin, said chain tensioning spring allowing a reversible displacement, circumferential around said predetermined axis and axial along said predetermined axis of said support body, with respect to said locking bush.

Preferably, there are two of said shaped attachment portions of each of said first and second component and they are opposite one another with respect to said predetermined axis.

Advantageously, the two opposite shaped attachment portions allow good stability of the fastening during use of the mounting device.

Preferably, said shaped attachment portions of each of said first and second component are symmetrical.

Advantageously, the operator does not have to be careful to orient the first and second component during assembling. Moreover, the axial load to which the abutment element is subjected is evenly distributed along the circumferential extension of the abutment element itself. Indeed, central portions of the first and second component (arranged between the respective shaped attachment portions) are arranged substantially aligned, diametrically opposite.

Alternatively, the shaped attachment portions of each of said first and second component are asymmetrical. In this way, the central portions of the first and second component, which are not arranged aligned, can be suitably sized in the case in which the load to which the abutment element is subjected has a radial component (i.e. in the case in which the load is not completely axial).

In accordance with a preferred characteristic of the invention, said first and second component can be removably connected.

Advantageously, easy disassembling and re-assembling of the mounting device is thus permitted.

It should be observed that ease of disassembling is a very advantageous characteristic, whereas the integrity of the abutment element for its possible re-assembling is not excessively important: indeed, if damaged, the first and second component can be replaced during re-assembling of the device of the invention, without this entailing a substantial cost.

Preferably, said shaped attachment portions of said first component are arranged radially outside with respect to said shaped attachment portions of said second component, when said first and second component are connected.

More preferably, each of said shaped attachment portions of said second component comprises an arm shaped part and a toothed end part, said arm shaped parts wrapping around said annular seat, said toothed end parts being arranged in corresponding recesses of said shaped attachment portions of said first component.

Advantageously, the toothed end parts arranged in the recesses of the shaped attachment portions further improve the stability of fastening during use of the mounting device.

Preferably, each of said shaped attachment portions of said first component comprises an arm shaped end part that wraps around the respective arm shaped part of the respective shaped attachment portion of said second component.

More preferably, at least one of said toothed end parts comprises an undercut.

Advantageously, the undercut ensures a firmer fastening between the first and second component, blocking their separation under force.

In accordance with a preferred characteristic of the invention, said first and second component comprise a respective radially outer recess.

Preferably, said radially outer recesses are provided in central portions of each of said first and second component, said central portions being arranged between the respective shaped attachment portions.

Advantageously, the radially outer recesses facilitate assembling of the first and second component, making it easier to elastically open out the respective shaped attachment portions.

Furthermore, the radially outer recesses make it easier to manoeuvre the first and second component during assembling, through the use of suitable tools, which are described below. Indeed, the radially outer recesses are suitable for housing suitably shaped ends of such tools.

Preferably, the annular seat has a radial depth substantially equal to or greater than the radial extension of the arm shaped parts of the shaped attachment portions of said second component.

Advantageously, with such radial depths (especially in the case in which it is greater than the radial extension of the arm shaped parts) the first and second components are fastened more firmly and can withstand substantial axial loads.

In a second aspect thereof, the present invention concerns a bicycle rear gearshift comprising a mounting device as described above.

An abutment element suitable for being associated in an annular seat is also described.

In particular, an abutment element is described comprising a first and a second component, which are shaped like annular sector and that can be connected together through respective shaped attachment portions.

Advantageously, such an abutment element has a high resistant cross section (which extends for the entire circumferential extension of the annular seat) which can be subjected to substantial loads, greater than those tolerated by an elastic stop ring the circumferential extension of which is not complete.

Moreover, such an abutment element ensures more balanced support for the element on which it acts with respect to an elastic stop ring the circumferential extension of which is not complete right because it has substantially complete circumferential extension, avoiding misalignments between the abutment element and the element on which it acts during use.

Furthermore, such an abutment element allows extremely convenient manual assembling, as well as easy disassembling.

Preferably, there are two of said shaped attachment portions of each of said first and second component and they are opposite one another with respect to said predetermined axis.

Advantageously, the two opposite shaped attachment portions allow good stability of fastening during use.

Preferably, said shaped attachment portions of each of said first and second component are symmetrical.

Advantageously, the operator does not have to be careful to orient the first and second component during assembling. Moreover, the axial load to which the abutment element is subjected is evenly distributed along the circumferential extension of the abutment element itself. Indeed, central portions of the first and second component (arranged between the respective shaped attachment portions) are arranged substantially aligned, diametrically opposite.

Alternatively, the shaped attachment portions of each of said first and second component are asymmetrical. In this way, the central portions of the first and second component, which are not arranged aligned, can be suitably sized in the case in which the load to which the abutment element is subjected has a radial component (i.e. in the case in which the load is not completely axial).

Preferably, said first and second component can be removably connected.

Advantageously, easy disassembling and re-assembling of the abutment element is thus permitted.

It should be observed that ease of disassembling is a very advantageous characteristic, whereas the integrity of the abutment element for its possible re-assembling is not excessively important: indeed, if damaged, the first and second component can be replaced during re-assembling, without this entailing a substantial cost.

Preferably, said shaped attachment portions of said first component are arranged radially outside with respect to said shaped attachment portions of said second component, when said first and second component are connected.

More preferably, each of said shaped attachment portions of said second component comprises an arm-shaped part and a toothed end part, said arm shaped parts wrapping around said annular seat, said toothed end parts being arranged in corresponding recesses of said shaped attachment portions of said first component.

Advantageously, the toothed end parts arranged in the recesses of the shaped attachment portions further improve the stability of fastening during use.

Preferably, each of said shaped attachment portions of said first component comprises an arm shaped end part that wraps around the respective arm-shaped part of the respective shaped attachment portion of said second component.

More preferably, at least one of said toothed end parts comprises an undercut.

Advantageously, the undercut ensures firmer fastening between the first and second component, blocking their separation under force.

Preferably, said first and second component comprise a respective radially outer recess.

Preferably, said radially outer recesses are provided in central portions of each of said first and second component, said central portions being arranged between the respective shaped attachment portions.

Advantageously, the radially outer recesses facilitate assembling of the first and second component, making it easier to elastically open out the respective shaped attachment portions.

Furthermore, the radially outer recesses make it easier to manoeuvre the first and second component during assembling, through the use of suitable tools, which are described below. Indeed, the radially outer recesses are suitable for housing suitably shaped ends of such tools.

Preferably, the annular seat has a radial depth substantially equal to or greater than the radial extension of the arm shaped parts of the shaped attachment portions of said second component.

Advantageously, with such radial depths (especially in the case in which it is greater than the radial extension of the arm shaped parts) the first and second components are fastened more firmly and can withstand substantial axial loads.

Initially with reference to FIGS. 1, 1a and 2-7, a bicycle rear gearshift in accordance with the present invention is shown. Such a rear gearshift is wholly indicated with 100.

The rear gearshift 100 in turn comprises, according to the present invention, a device 1 for mounting the rear gearshift 100 on a bicycle frame 160.

The rear gearshift 100 comprises a derailleur 12 made according to an articulated quadrilateral actuation linkage, more precisely an articulated parallelogram actuation linkage.

The actuation linkage comprises, at the four sides of the parallelogram, a support body 2, a chain guide 17 and a pair of connecting rods 14 and 16. Such four components 2, 17, 14 and 16 are articulated to one another—around respective rotation axes—at four articulation pins.

The support body 2 is mounted on the bicycle frame 160. The support body 2 can be rotatably associated with the frame 160 around an axis X.

The chain guide 17 is opposite the support body 2 in the actuation linkage. Such a chain guide 17 comprises a rocker arm group 150 that moves a bicycle chain (not shown) between different engagement positions on respective sprockets of a bicycle sprocket set (not shown).

The connecting rods 14 and 16 connect the chain guide 17 to the support body 2 in a mobile manner.

The connecting rod 16 is also identified as "inner connecting rod" since it is the one that in use faces the bicycle frame 160, whereas the connecting rod 14 is also identified as "outer connecting rod" since it is the one that in use faces outwards, i.e. arranged on the opposite side to the bicycle frame 160.

The mounting device 1 comprises a pin 33 (in the form of a screw), the support body 2, a locking bush 27, a chain tensioning spring 28 (of the helical type) and an abutment element 117.

The pin 33 has a predetermined axis X, and is provided with an enlarged head 33a and with a threaded end portion 33b, which is screwed into a corresponding seat such as a threaded hole 161 of the bicycle frame 160.

The pin 33 crosses the support body 2 at a through hole 2a thereof. The enlarged head 33a abuts in a corresponding seat 2b (which is preferably substantially cylindrical) of the support body 2.

Figure 11:
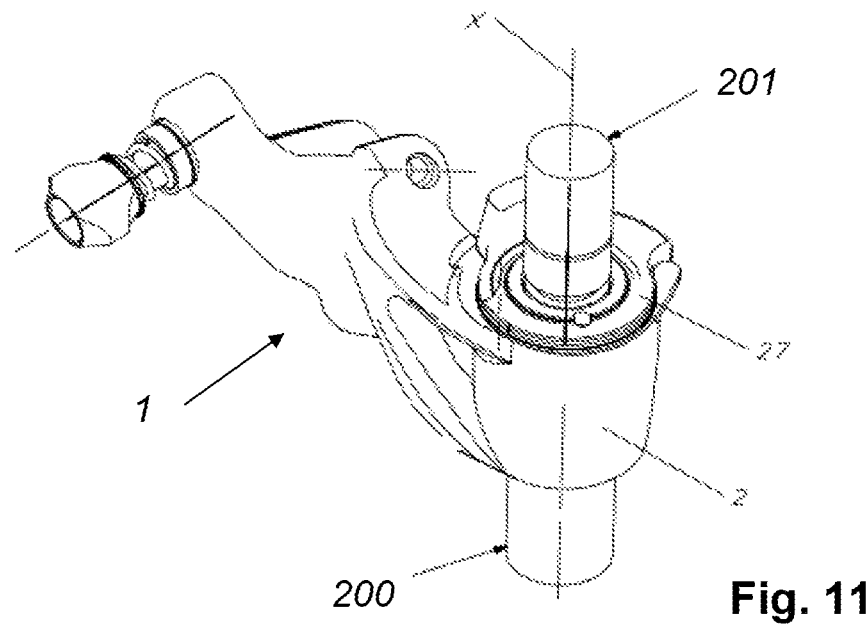
FIG. 11 is a perspective view of a part of the rear gearshift of FIG. 1, with two attachment tools of a pin of the respective mounting device.
Figure 12:
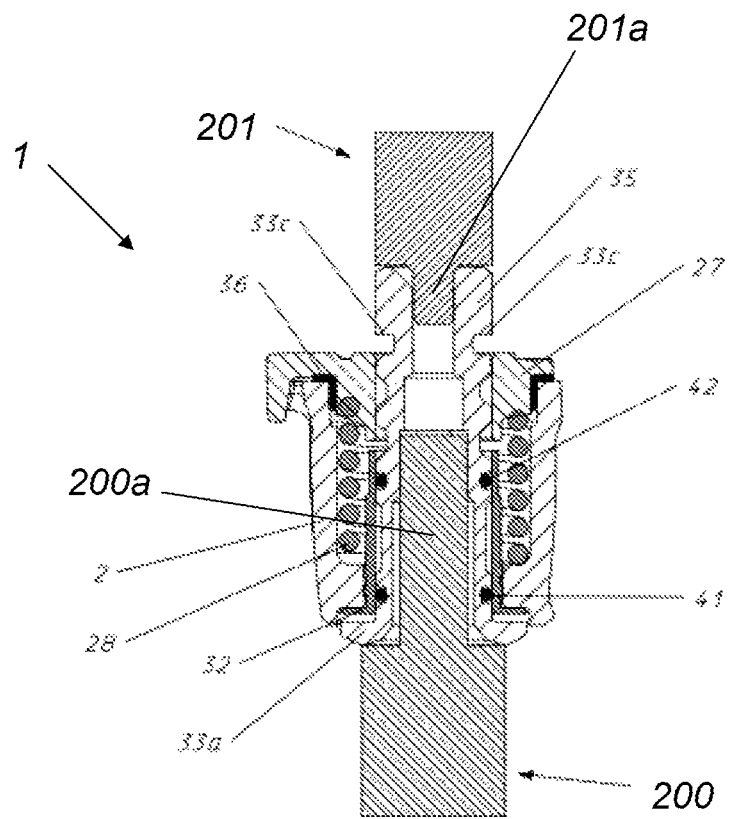
FIG. 12 is a longitudinal section view of a detail of the mounting device of FIG. 11, with the two attachment tools of FIG. 11.

The pin 33 is preferably hollow and has two shaped inner portions 34, 35 for receiving attachment tools 200 and 201, provided with suitably shaped ends 200a and 201a, respectively (FIGS. 11 and 12).

The locking bush 27 has a through hole 27a formed in it and crossed by the pin 33 so that the locking bush 27 is rotatable with respect to the pin 33.

The locking bush 27 also comprises a tooth 29 that is arranged in abutment against a so-called "fork" 162 of the bicycle frame 160.

The chain tensioning spring 28 is housed in an annular cavity 2c (which is preferably substantially cylindrical) formed in the through hole 2a of the support body 2.

The chain tensioning spring 28 acts on the locking bush 27:

i) around the axis X, so that the support body 2 is thrusted into rotation circumferentially with respect to the locking bush 27 when the tooth 29 is in abutment against the fork 162 of the bicycle frame 160; and ii) along the axis X of the pin 33, so that the locking bush 33 is thrusted axially towards the threaded end portion 33b of the pin 33.

In particular, the chain tensioning spring 28 acts between an abutment surface 2d of the annular cavity 2c and an abutment surface 27d of said locking bush 27. More specifically, an end of the chain tensioning spring 28 is housed in a hole (not shown) formed on the abutment surface 2d, and the opposite end is housed in a hole (not shown) formed on the abutment surface 27d.

The chain tensioning spring 28 together with a spring (typically of the helical type, not shown) for tensioning the chain of the rocker arm group 150, determines a balanced condition that defines the position of the rocker arm group 150 with respect to the sprocket set.

As well as the function of tensioning the chain, the spring 28 of the support body 2 also has the function of absorbing bumps to which the rear gearshift 100 is inevitably subjected during use.

The abutment element 117 is associated with the pin 33 in an annular seat 33c thereof, in which the abutment element 117 closes the locking bush 27 on the pin 33, i.e. provides a support in the axial direction to the locking bush 27 on the pin 33.

The chain tensioning spring 28 allows a reversible circumferential displacement, around the axis X, and axial displacement (although to a lesser extent, to due restrictions provided by the abutment element 117 and by the enlarged head 33a), along the axis X of the pin 33, of the support body 2 with respect to the locking bush 27. In this way, the bumps that the rear gearshift 100 inevitably undergoes are absorbed by the spring 28 of the mounting device 1, after which the spring 28 goes back into an assembling position, re-establishing a reciprocal assembling position between the locking bush 27 and the support body 2.

In order to facilitate the reciprocal circumferential displacement (about the axis X) and axial displacement (along the axis X) of the locking bush 27 and of the support body 2, a first sliding element 36 is arranged between the locking bush 27 and the support body 2.

The first sliding element 36 is preferably fixedly connected to the support body 2, at a free axial end 2e of the through hole 2a of the support body 2.

The free axial end 2e is preferably substantially cylindrical, and is arranged alongside the annular cavity 2c of the support body 2. The free axial end 2e has a greater internal diameter than that of the annular cavity 2c.

The first sliding element 36 is substantially cylindrical, and is provided with a flange 36a that abuts on the top of the free axial end 2e of the through hole 2a.

Moreover, in order to facilitate the reciprocal circumferential displacement (around the axis X) and axial displacement (along the axis X) of the support body 2 and of the pin 33, a second sliding element 32 is arranged between the pin 33 and the through hole 2a of the support body 2.

The second sliding element 32 is preferably fixedly connected to the support body 2, at an axial end 2f of the through hole 2a of the support body 2.

The axial end 2f is preferably substantially cylindrical, and is arranged alongside the seat 2b of the support body 2. The axial end 2f has a smaller internal diameter than that of the seat 2b. In particular, as is clearly shown in FIG. 3, the axial end 2f is arranged between the seat 2b and the annular cavity 2c.

The second sliding element 32 is substantially cylindrical, and is provided with a flange 32a that abuts on the seat 2b. The flange 32 thus stayed arranged between the enlarged head 33a of the pin 33 and the seat 2b.

The second sliding element 32 has an axial extension (along the axis X) such that it is arranged in at least part of the annular cavity 2c, the chain tensioning spring 28 being housed radially outside the second sliding element 32.

At least one O-ring element (in the non-limiting example of FIG. 3, there are two O-ring elements 41 and 42) is arranged between the second sliding element 20 and the pin 33. The O-ring elements 41 and 42 are arranged in respective annular seats 41a and 42a made on the pin 33.

In accordance with a characteristic of the present invention, the abutment element 117 comprises a first and a second component 117a, 117b, which are configured like an annular sector and which can be connected together through respective shaped attachment portions 118a, 118b. Preferably, the abutment element 117 is made from spring steel.

There are two shaped attachment portions 118a, 118b of each of the first and second component 117a, 117b and they are opposite one another with respect to the axis X.

Figure 4:
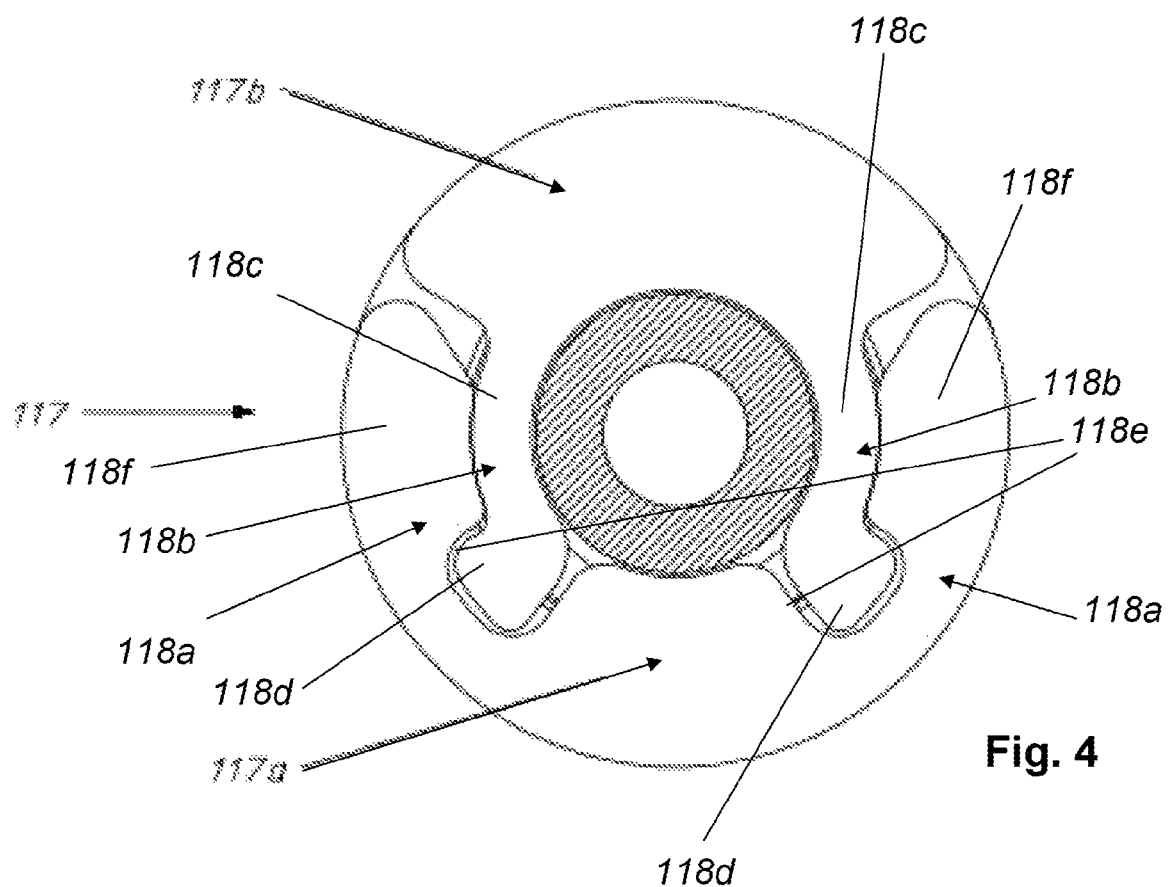
FIG. 4 is an enlarged cross section view of a detail of the mounting device of FIG. 1.

In the preferred embodiment illustrated in FIG. 4, the shaped attachment portions 118a, 118b of each of the first and second component 117a, 117b are symmetrical.

Figure 5:
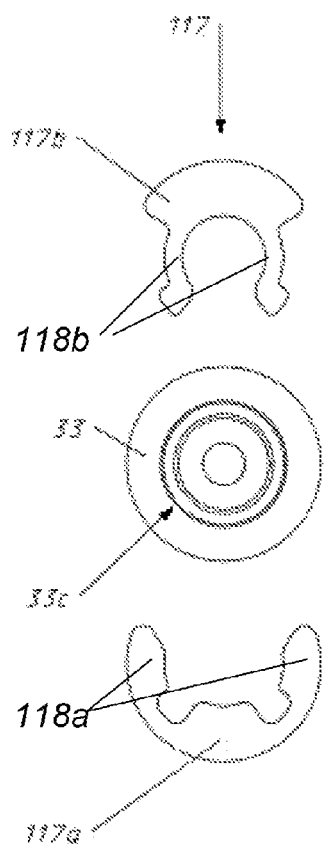
FIGS. 5-7 are plan views of successive assembling steps of an abutment element of the mounting device of FIG. 1.
Figure 6:
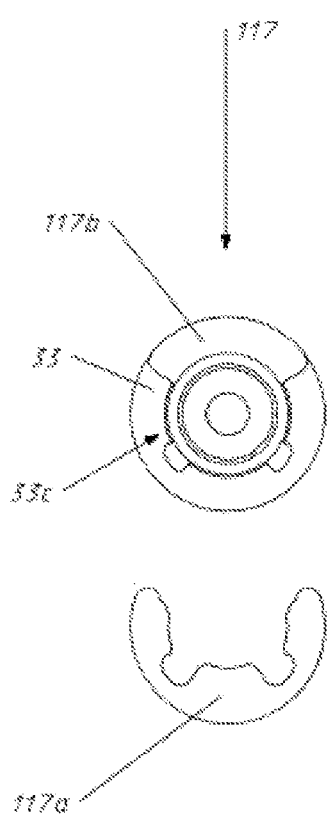
Figure 7:
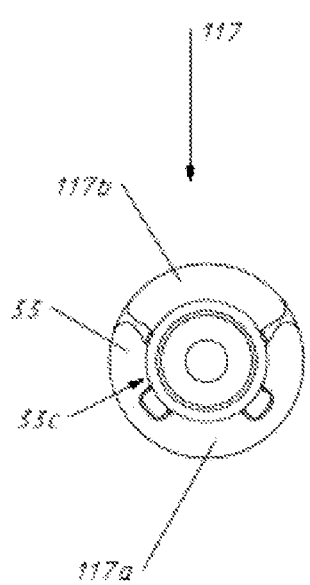

The first and second component 117a, 117b can be removably connected, according to the sequence of assembling steps shown in FIGS. 5 to 7 and in FIGS. 13 to 16, and according to the sequence of disassembling steps shown in FIGS. 17 to 20.

The shaped attachment portions 118a of the first component 117a are arranged radially outside with respect to the shaped attachment portions 118b of the second component 117b, when the first and second component 117a, 117b are connected.

Each of the shaped attachment portions 118b of the second component 117b comprises an arm-shaped part 118c and a toothed end part 118d. The arm-shaped parts 118c wrap around the annular seat 33c and the toothed end parts 118d are arranged in corresponding recesses 118e of the shaped attachment portions 118a of the first component 117a.

Each of the shaped attachment portions 118a of the first component 117a comprises an arm shaped end part 118f that wraps around a respective arm shaped part 118c of a respective shaped attachment portion 118b of the second component 117b.

In the example of FIGS. 5-7, the annular seat 33c has a radial depth substantially equal to the radial extension of the arm shaped parts 118c of the shaped attachment portions 118b. It may however be advantageous to have a radial depth that is greater than the radial extension of the arm shaped parts 118c, so that in use the first and second component 117a and 117b are more firmly fastened and can withstand substantial axial loads.

Figure 8:
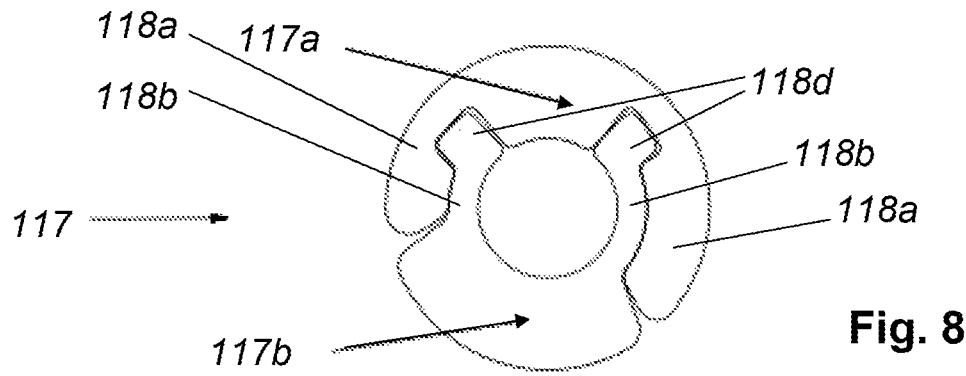
FIGS. 8-10 are plan views of further embodiments of an abutment element of respective mounting devices according to the present invention.
Figure 9:
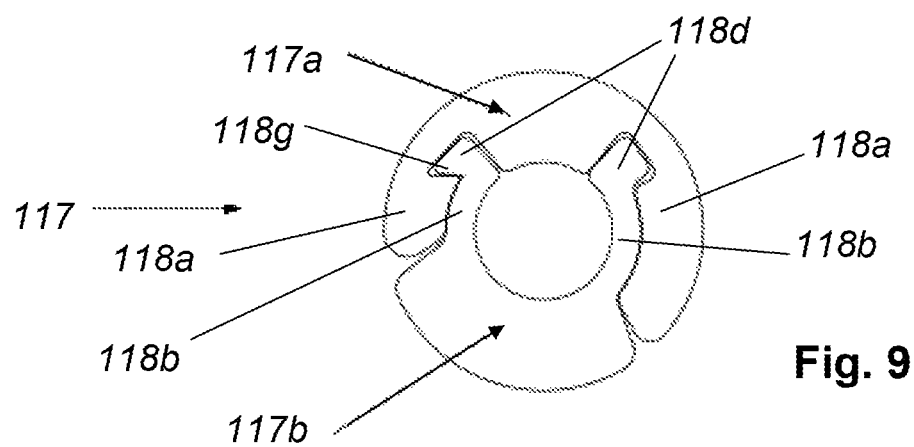
Figure 10:
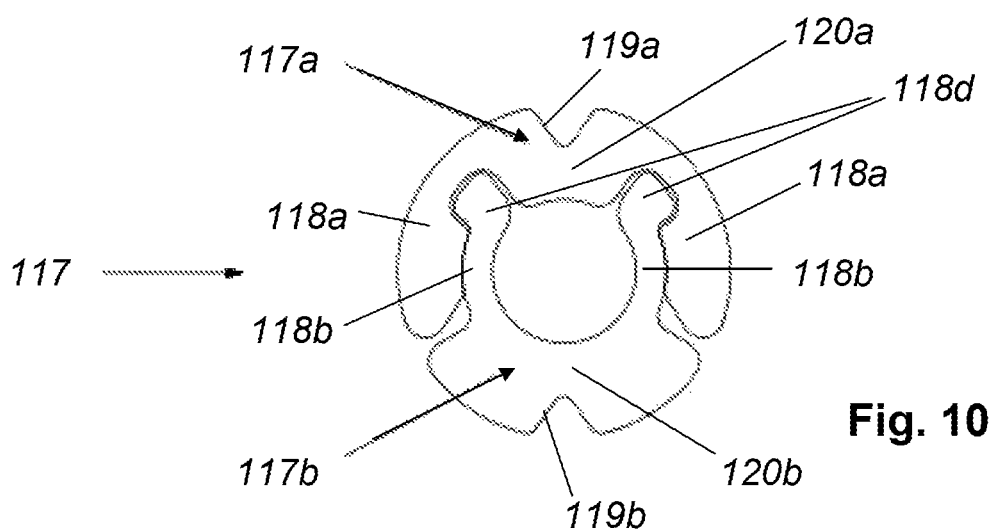

FIGS. 8-10 show further embodiments of the abutment element 117. In such Figures, structural elements that are identical or equivalent in functional terms to those of the abutment element 117 described above with reference to FIGS. 1-7 (in particular, to FIG. 4) will be given the same reference numerals and they will not be described any further.

In particular, the embodiment of the abutment element 117 shown in FIG. 8 differs from the abutment element 117 of FIG. 4 in that the shaped attachment portions 118a, 118b of each of the first and second component 117a, 117b are asymmetrical.

Also in the embodiment of the abutment element 117 shown in FIG. 9 the shaped attachment portions 118a, 118b of each of the first and second component 117a, 117b are asymmetrical. Moreover, the abutment element 117 of FIG. 9 differs from the abutment element 117 of FIG. 8 in that the toothed end part 118d of one of the shaped attachment portions 118b of the second component 117b comprises an undercut 118g, whereas the other toothed end part 118d does not have one (alternatively, the other toothed end part 118d could also comprise an undercut). The undercut 118g ensures a firmer fastening between the first and second component 117a and 117b, blocking their separation under stress.

The toothed end parts 118d shown in the non-limiting example embodiments of FIGS. 4, 8 and 10 do not have undercuts, but they could alternatively comprise undercuts in one or both of the shaped attachment portions 118b.

The embodiment of the abutment element 117 shown in FIG. 10 differs from the abutment element 117 of FIG. 4 in that the first and second component 117a, 117b comprise a respective radially outer recess 119a, 119b.

The radially outer recesses 119a, 119b are provided in central portions 120a, 120b of each of the first and second component 117a, 117b, in which central portions 120a, 120b are arranged between the respective shaped attachment portions 118a, 118b.

The assembling and disassembling of the abutment element 117 of the mounting device 1 according to the present invention is already clear from what has been stated above, and it is described further hereafter, referring in particular to FIGS. 5-7 and 13-20.

Figure 21:
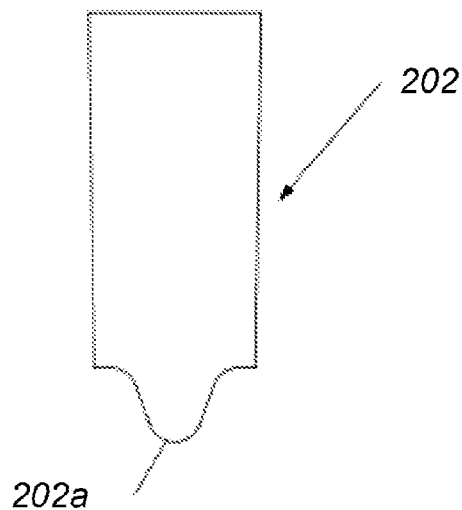
FIGS. 21 and 22 are plan and perspective views of the assembling tool of FIGS. 13-16.
Figure 22:
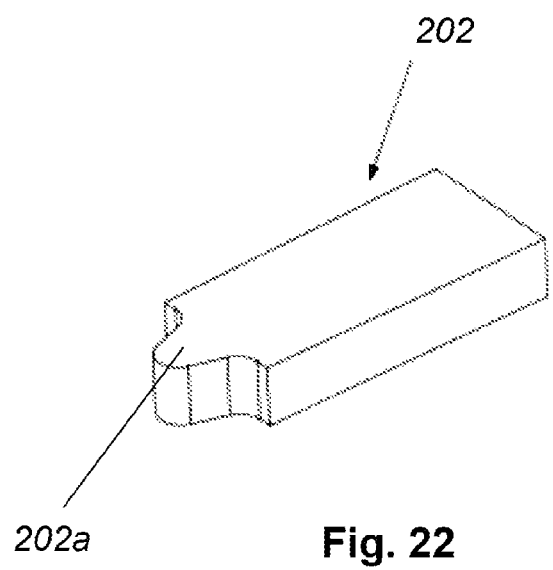

FIGS. 5 and 13 show the first and second component 117a, 117b that must again be arranged in the annular seat 33c. FIG. 13 shows a pair of assembling tools 202 (FIGS. 21 and 22), provided with shaped ends 202a that are housed in the radially outer recesses 119a, 119b of the first and second component 117a, 117b of the abutment element 117 of FIG. 10.

The second component 117b is firstly mounted in the annular seat 33c, thanks to an elastic opening out of the shaped attachment portions 118b, until the arm shaped parts 118c of the shaped attachment portions 118b wrap around part of the annular seat 33c (FIGS. 6 and 14). In particular, FIG. 14 shows the assembling tool 202 carrying the second component 117b that is radially brought close to the annular seat 33c.

Thereafter, the first component 117a is mounted in the annular seat 33c and is simultaneously connected to the second component 117b, thanks to an elastic opening out of the shaped attachment portions 118a, until the arm shaped end parts 118f of the shaped attachment portions 118a of the first component 117a wrap around the respective arm shaped parts 118c of the respective shaped attachment portions 118b of the second component 117b. At the same time, the toothed end parts 118d of the second component 117b go—substantially snap—into the corresponding recesses 118e of the shaped attachment portions 118a of the first component 117a (FIGS. 7 and 15). In particular, FIG. 15 shows the assembling tool 202 carrying the first component 117a that is radially brought close to the annular seat 33c, whereas the assembling tool 202 carrying the second component 117b is kept in the position taken up in FIG. 14. FIG. 16 show the two assembling tools 202 that are moved away, for example radially, from the first and second component 117a, 117b.

In order to dismount the abutment element 117, firstly the first component 117a is removed (with an elastic opening out of the shaped attachment portions 118a) and then the second component 117b is removed (with an elastic opening out of the shaped attachment portions 118b).

Figure 23:
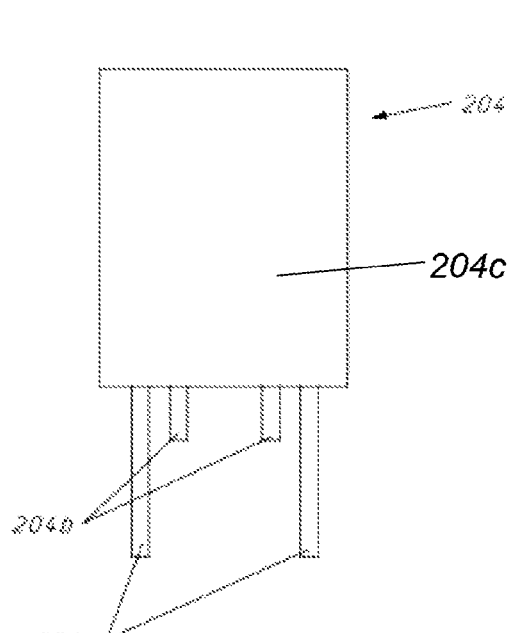
FIGS. 23 and 24 are plan and perspective views of the disassembling tool of FIGS. 17-20.
Figure 24:
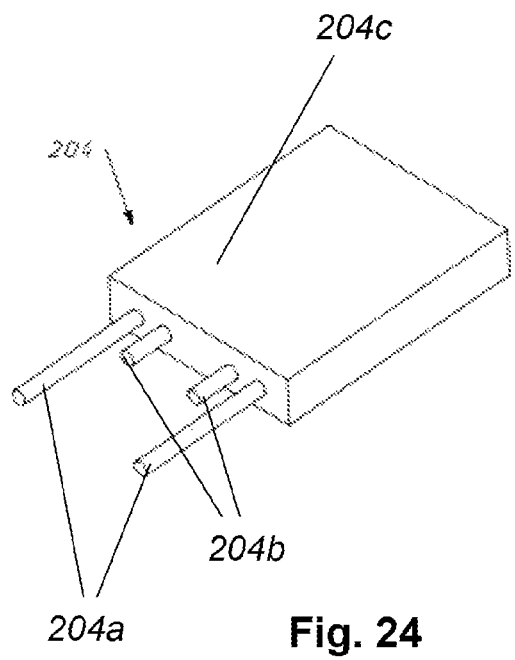

FIGS. 17-20 show the disassembling of the abutment element 117 of FIG. 10 through the use of a disassembling tool 204 (FIGS. 23 and 24), provided with two pairs of pins 204a and 204b that extend from a support body 204c.

The pins 204a are longer than the pins 204b. The pins 204a are arranged outside of the pins 204b, on two opposite sides with respect to the pins 204b.

Figure 17:
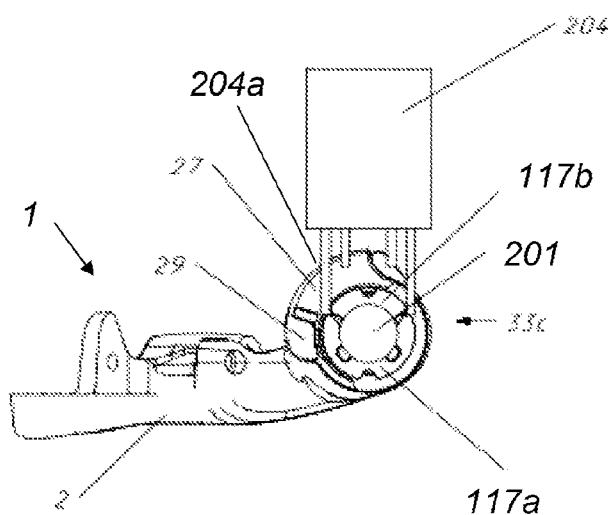
FIGS. 17-20 are views of successive disassembling steps of the abutment element of FIG. 10 on the respective mounting device, carried out with a disassembling tool of components of the abutment element of FIG. 10.
Figure 18:
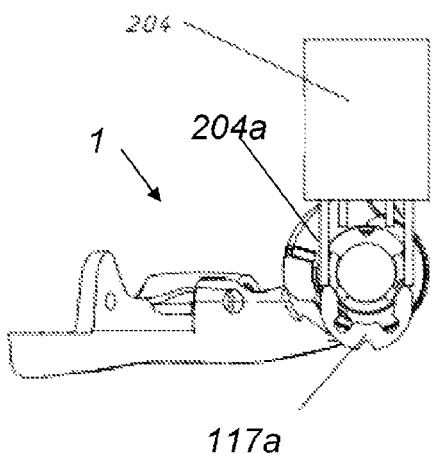

In particular, FIGS. 17 and 18 show the disassembling tool 204 that is radially brought close to the first component 117a so that the pins 204a radially thrust free ends of the arm shaped end parts 118f of the shaped attachment portions 118a of the first component 117a, until the first component 117a detaches from the second component 117b.

Figure 19:
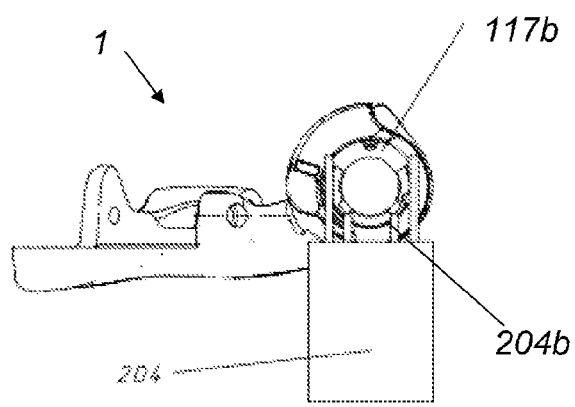
Figure 20:
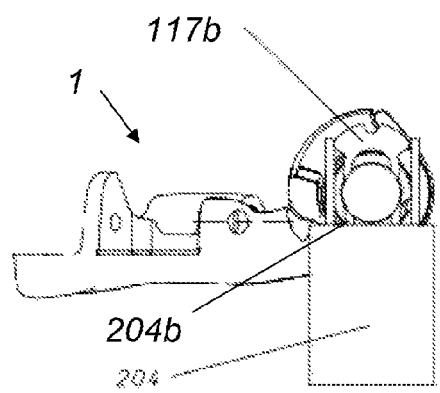

FIGS. 19 and 20 show the disassembling tool 204 that is radially brought close to the second component 117b so that the pins 204b radially thrust (in a direction substantially opposite the one used in FIGS. 17 and 18) free ends of the arm shaped parts 118c of the respective shaped attachment portions 118b of the second component 117b, until the second component 117b detaches from the annular seat 33c.

Of course, the man skilled in the art can bring numerous modifications and variants to the device for mounting a derailleur of a rear gearshift on a bicycle frame and to the bicycle rear gearshift described above, in order to satisfy specific and contingent requirements, all of which are in any case covered by the scope of protection of the present invention as defined by the following claims.

Finally, it should be observed that the abutment element suitable for being associated in an annular seat described above can also be used in other bicycle components or more generally in other mechanical devices, for example where elastic stop rings are provided, replacing and/or in combination with them.

What is claimed is:

1. A device for mounting a derailleur of a rear gearshift onto a bicycle frame, comprising:
a pin suitable for being fixed in a corresponding seat of said bicycle frame;
an annular seat formed on said pin;
a support body of said derailleur;
a through hole, formed in said support body and crossed by said pin;
an abutment element associated with said pin in said annular seat, in which said abutment element provides a support in an axial direction on said pin;
wherein said abutment element comprises a first and a second component, which are configured as annular sectors and which can be connected together through respective shaped attachment portions,
said shaped attachment portions of said first component are arranged radially outside with respect to said shaped attachment portions of said second component when said first and second component are connected, and
each of said shaped attachment portions of said second component comprises an arm part and a toothed end part, said arm parts wrapping around said annular seat, said toothed end parts being positioned in corresponding recesses of said shaped attachment portions of said first component.

2. The device according to claim 1, wherein:
said pin is a screw that has a predetermined axis and is provided with an enlarged head and with a threaded end portion, said enlarged head abutting in a corresponding seat of the support body; and
said corresponding seat of said bicycle frame is a threaded hole.

3. The device according to claim 2, comprising:
a locking bush having a further through hole formed in it and crossed by said pin so that the locking bush is rotatable with respect to the pin, the locking bush comprising a tooth suitable for going into abutment against a fork of said bicycle frame;
a chain tensioning spring, housed in an annular cavity formed in said through hole of said support body and that acts on said locking bush i) around said predetermined axis, so that said support body is thrusted into rotation circumferentially with respect to said locking bush when said tooth is in abutment against said fork of said bicycle frame, and ii) along said predetermined axis of said pin, so that said locking bush is thrusted axially towards said threaded end portion of said pin;
wherein said abutment element provides a support in the axial direction to said locking bush on said pin, said chain tensioning spring allowing a reversible displacement, circumferential around said predetermined axis and axial along said predetermined axis of said support body, with respect to said locking bush.

4. The device according to claim 2, wherein there are two of said shaped attachment portions of each of said first and second component and they are opposite one another with respect to said predetermined axis.

5. The device according to claim 4, wherein said shaped attachment portions of each of said first and second component are symmetrical.

6. The device according to claim 1, wherein said first and second component are removably connectable.

7. The device according to claim 1, wherein each of said shaped attachment portions of said first component comprises an arm shaped end part that wraps around the respective arm part of the respective shaped attachment portion of said second component.

8. A device for mounting a derailleur of a rear gearshift onto a bicycle frame, comprising:
a pin suitable for being fixed in a corresponding seat of said bicycle frame;
an annular seat formed on said pin;

a support body of said derailleur;

a through hole, formed in said support body and crossed by said pin;

an abutment element associated with said pin in said annular seat, in which said abutment element provides a support in an axial direction on said pin;

wherein said abutment element comprises a first and a second component which can be connected together through shaped attachment portions, and said first and second component comprise a respective radially outer recess.

9. The device according to claim 7, wherein the annular seat has a radial depth substantially equal to or greater than a radial extension of the arm shaped parts of the shaped attachment portions of said second component.

10. A bicycle rear gearshift comprising a mounting device according to claim 1.

* * * * *